Figure 4:
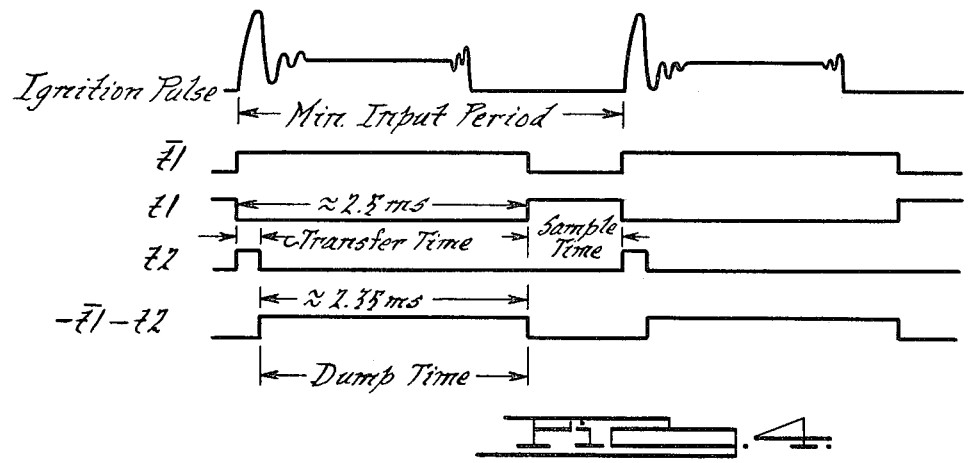

United States Patent [19]
Kennedy

[11] 4,252,096
[45] Feb. 24, 1981

[54] ELECTRONIC GOVERNOR CONTROL

[75] Inventor: John F. Kennedy, Dearborn Heights, Mich.

[73] Assignee: Ford Motor Company, Dearborn, Mich.

[21] Appl. No.: 954,135

[22] Filed: Oct. 23, 1978

[51] Int. Cl.³ .................................................. B60K 31/00
[52] U.S. Cl. ...................................... 123/370; 123/349; 180/179
[58] Field of Search ............... 123/102; 180/175, 176, 180/177, 178, 179

[56] References Cited

U.S. PATENT DOCUMENTS

| 3,374,374 | 3/1968 | Smith | 123/102 |
|---|---|---|---|
| 3,485,316 | 12/1969 | Shavin et al. | 123/102 |
| 3,511,329 | 5/1970 | Wisner | 123/102 |
| 3,575,256 | 4/1971 | Jania et al. | 180/176 |
| 3,766,367 | 10/1973 | Sumiyoshi et al. | 123/102 |
| 3,868,933 | 3/1975 | Bigalke et al. | 123/102 |
| 3,946,707 | 3/1976 | Gray | 180/176 |
| 3,998,191 | 12/1976 | Beyerlan et al. | 180/176 |
| 4,006,791 | 2/1977 | Feldmann et al. | 180/176 |
| 4,134,373 | 1/1979 | Kibler et al. | 123/102 |
| 4,157,126 | 6/1979 | Collonia | 123/102 |

Primary Examiner—Charles J. Myhre
Assistant Examiner—Raymond A. Nelli
Attorney, Agent, or Firm—Paul K. Godwin, Jr.; Clifford L. Sadler

[57] ABSTRACT

An electronic governor control for an automotive engine that prevents the speed of the engine from exceeding a predetermined limit. The electronic circuitry responds to ignition pulses and limits the throttle opening of the vehicle to maintain the predetermined speed limit. The electronic governor control also includes circuitry to prevent engine overshoot of the predetermined limit by monitoring the rate of acceleration and adjusting the predetermined limit to anticipate and initiate governor control prior to the engine reaching the predetermined speed limit. Circuitry is also included which allows the governor control to retain control of the engine until the accelerator control reduces the speed of the engine to a speed value below the predetermined limit.

6 Claims, 7 Drawing Figures

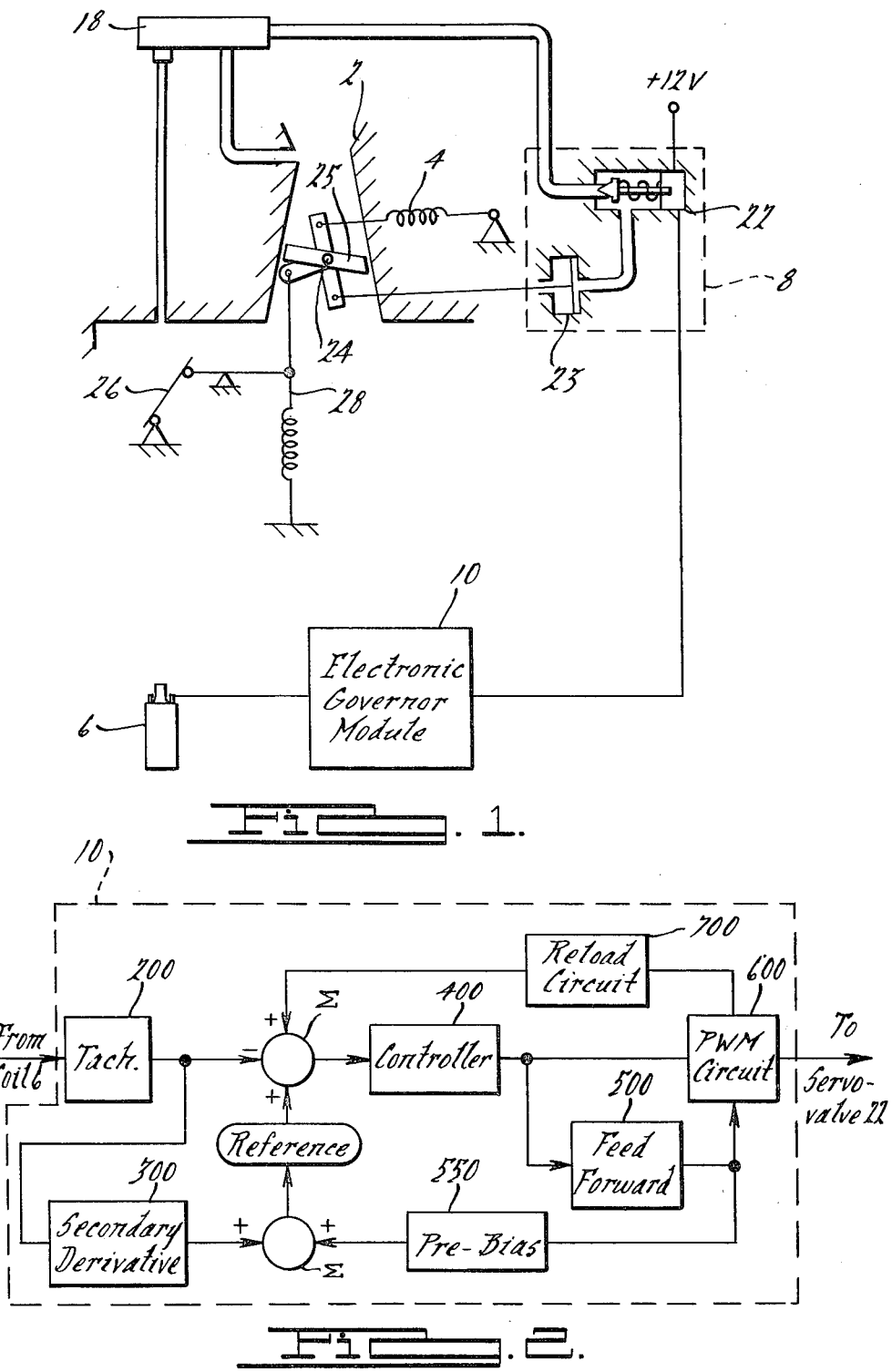

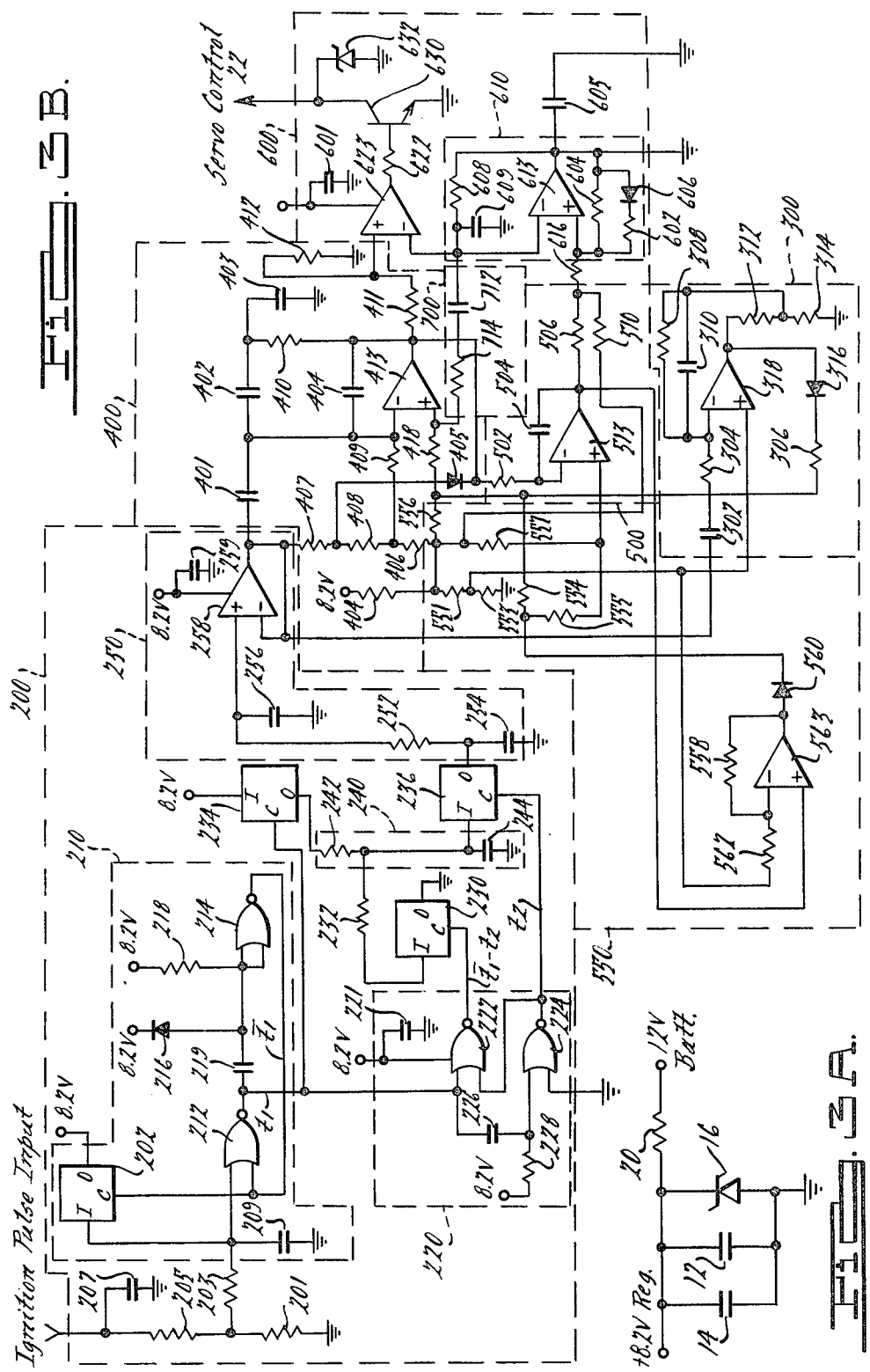

ELECTRONIC GOVERNOR CONTROL

BACKGROUND OF THE INVENTION

FIELD OF THE INVENTION

The present invention is directed to the field of automotive engine governors and in particular an electronic control circuit for controlling a governor mechanism.

SUMMARY OF THE INVENTION

The present invention relates to a governor control circuit that monitors the engine RPM and prevents the engine RPM from going above a preset speed.

An overall system for controlling the speed of an engine is shown in FIG. 1 and includes a carburetor 2 having a split throttle shaft 24 for mounting a throttle plate 25. The split throttle shaft 24 is normally controlled by accelerator pedal 26 and associated linkage 28 to control the speed of the engine by regulating the air fuel mixture passing the throttle plate 25. One side of the split throttle shaft 24 is connected to a vacuum servo motor 8 and a biasing spring 4. The vacuum servo motor 8 comprises an electrically controlled servo valve 22 and a vacuum diaphragm 23. The servo valve 22 is controlled by an electronic governor control circuit 10; and the vacuum diaphragm 23 is connected to the one side of the split throttle shaft 24 for take-over control of the throttle plate 25 from the accelerator pedal 26. Carburetors of the type schematically represented in FIG. 1 with a split throttle shaft are commercially available from Holley Carburetor Company and are designated as models 4150 EG, 4180 EG, and 2300 EG.

In this configuration, when the electronic governor control circuit 10 determines that the engine speed is close to a predetermined speed limit, or rapidly approaching that limit, an electrical signal is delivered to the servo valve 22 to regulate the amount of vacuum applied to the diaphragm 23 from the vacuum manifold 18. The greater the vacuum applied to the diaphragm 23, the more the controlled throttle plate 25 will be closed. In contrast, when the electronic governor circuit 10 ceases to produce an electrical signal to the servo valve 22, a biasing spring 4 returns the throttle plate 25 back to control by the accelerator pedal 26 and its associated linkage 28.

A functional block diagram of the electronic governor control unit 10 is shown in FIG. 2. In this diagram, a tachometer 200 is used to determine the speed of the engine by receiving a pulse train from the primary of the ignition coil 6. The tachometer 200 generates a variable DC voltage level which varies as a function of the engine speed. The output of the tachometer 200 is fed to a controller circuit 400 where it is compared with a reference voltage from a controlled reference supply. The reference voltage is preset to correspond to a predetermined RPM limit for the engine. The controller 400 compares the preset reference voltage with the output of the tachometer 200 and generates an output when tachometer 200 voltage goes below the reference voltage. The output of the controller 400 is then fed to a pulse width modulating circuit 600 which supplies a modulating voltage to the servo valve 22 to control the split throttle plate 24.

Strictly speaking, the tachometer, controller and pulse width modulator in combination with the engine components described above are sufficient to limit the speed of an engine. However, practical problems concerning transitions between human operator (accelerator) control and electronic governor control of the engine are addressed below in order to make those transitions smooth and predictable.

One problem to overcome is the transient overshoot of the engine speed past its preset limit and subsequent return to that limit by the governor as a result of low to medium acceleration rates within the range of approximately 100–1000 RPM/second. To accomplish this, a feed forward circuit 500 and its associated pre-bias circuit 550 are connected between the output of the controller 400 and the reference supply at the input to the controller 400. In this system, the pre-bias circuit 550 adjusts the reference voltage, at the input of the controller 400, slightly higher than the preset reference voltage in order to cause the controller 400 to react at an earlier point (lower RPM) in anticipation of the low to medium acceleration rate and being earlier governor control of the engine.

As the controller 400 reacts to acceleration when the pre-bias artificial set point is reached, the feed forward circuit 500 correspondingly causes a decrease in the pre-bias voltage until it is removed, leaving only the preset reference voltage applied to the controller 400 input. In this manner, the controller 400 produces an output to control the pulse width modulation circuit 600 in anticipation of the engine speed reaching the predetermined limit and prevents overshoot in the low to medium acceleration rate range.

In the preferred embodiment discussed below, the pre-bias circuit 550 initially applies an approximately 250 millivolt DC level to the DC reference voltage, of 2.2 volts, in order to produce an artificial set point at approximately 250 RPM below the predetermined speed limit set point. When the engine speed reaches this lower artificial set point, the controller output increases. As the controller output increases to a value of 4.5 volts, the feed forward circuit 500 senses this voltage level, energizes the oscillator of the pulse width modulation circuit 600 to step up the duty cycle of the signal output therefrom and also de-energizes the pre-bias circuit 550. As the engine speed continues to increase towards the predetermined speed limit set point, the feed forward circuit 500 continues to suppress the pre-bias voltage and the reference input to controller 400 is returned to its original preset DC reference value.

Another problem to overcome is engine speed overshoot past the predetermined speed limit set point when high acceleration rates are encountered. To eliminate overshoot in such a situation, a secondary derivative circuit 300 is located between the output of the tachometer 200 and the reference supply at the input to the controller 400. In this case, the secondary derivative circuit 300 produces a DC voltage level proportional to the rate of acceleration and applies this output to modify the preset DC reference voltage. The output of secondary derivative circuit 300 allows, therefore, the controller 400 to react as much as 1000 RPM below the predetermined speed limit, since it is a function of acceleration rate. Of course, this earlier governor control below the actual predetermined speed limit set point in response to a rapid engine acceleration rate, causes that rate to be reduced since it has a negative feedback effect.

In addition to the above features which provide for controlling the various acceleration rates and preventing overshoot, another circuit is included to prevent the system from responding to very small RPM drops (20 RPM) below the set point when full engine power is applied. In a situation where an exact preset speed is attempted to be maintained by the governor and changing engine loads require a wide open throttle condition, the controller would generally cause the throttle plate to shift between the ungoverned wide open condition and back to a restricted or governed throttle control position, and thereby produce oscillative engine surging. Therefore, a reload circuit 700 is employed to prevent such engine surging by allowing a gradual recovery of engine speed to small RPM drops encountered from normal road/load variances and release the throttle to a full power wide open condition when the drop exceeds 100-200 RPM. The reload is defined as that point below the set point where the engine returns to full throttle. The reload of 100-200 RPM is accomplished by adding a feedback loop between an oscillator in the pulse width modulation circuit 600 and the input of the controller 400. The reload circuit 700 applies a nonsymmetrical AC coupled waveform to the controller 400 at the reference voltage input. This creates a control band around the set point in order to produce a proportional control. As a result, the throttle opening control becomes a more linear function of the RPM drop. This relationship holds true until the set point reloads and is exceeded.

FIG. 3A illustrates a voltage regulator which includes a resistor 20 having one end connected to the DC power supply of the vehicle, such as a 12 volt battery. The other end of the resistor 20 is connected to a Zener diode 16 which regulates the voltage to 8.2 volts. Capacitor filtering is employed using capacitors 12 and 14 connected across the Zener diode 16. The regulated 8.2 volts is used as a stable power source of the governor control circuit 10.

FIG. 3B is a detailed schematic of the electronic governor control circuit 10 which recieves as inputs ignition pulses from coil 6 and a regulated 8.2 volts, to control the current flowing through the servo control valve. The tachometer circuit 200 monitors the ignition pulse input and produces a DC output signal which is inversely related to ignition pulse frequency.

A high voltage input section comprises resistors 201, 203, and 205 whch form a "T" network for voltage division of the ignition pulse. This section reduces the level of the ignition pulse which may vary from 150 to 400 volts in amplitude. Resistors 201 and 205 produce a 10:1 voltage attenuation while resistor 203 is connected to limit the input current to approximately 200 microamps. The 10:1 voltage division gives a minimum threshold of 15 volts for sensing the ignition pulse even when the engine is under heavily loaded conditions. Capacitors 207 and 209 protect the input against large voltage transients that may be applied during ignition gate 212 changes from a normally high to a low level. The output of NOR gate 212 is designated as $t_1$ and is in turn fed to both inputs of the NOR gate 214 through a capacitor 219. The capacitor 219 is uncharged prior to the low level of $t_1$. When $t_1$ goes to the low level, the capacitor 219 charges through resistor 218 and thereby causes a positive going pulse of signal $\bar{t}_1$ to appear at the output of NOR gate 214. The high level of the $\bar{t}_1$ is fed back to a second input of the NOR gate 212 to hold it on and is also fed to the control input of the analog switch 202 to place a regulated 8.2 volts on the first input of the NOR gate 212. As mentioned above, the application of the regulated 8.2 volts on the first input of the NOR gate 212 protects it from the possible 40 volt peak ignition pulse, which may alter the switching threshold of the NOR gate 212. The $\bar{t}_1$ pulse remains at a high level until the capacitor 219 is charged, to the NOR gate 214 threshold level, in approximately 2.5 milliseconds. At that point, the output of the NOR gate 214 returns to a low level and the output of the NOR gate 212 returns to a high level. As the $\bar{t}_1$ signal goes from a high to a low level, the input block of the analog switch 202 is removed to await the input of the next ignition pulse. At that point, the capacitor 219 discharges through a diode 216. Therefore, the monostable circuit 210 provides the output signal $t_1$ as a timed one shot pulse corresponding to one ignition pulse.

The output signal $t_1$ of the monostable circuit 210 is fed to a sampling monostable circuit 220 which also responds to the return of the $t_1$ signal to its low level. The $t_1$ signal is fed to an input of NOR gate 222 and through a capacitor 226 to an input of NOR gate 224. Initially, the capacitor 226 is uncharged and begins to charge when the $t_1$ negative going signal is applied. The output of the NOR gate 222 goes to a high level that produces a rising edge of a signal designated as $t_2$. The capacitor 226 starts charging through resistor 228 and the $t_2$ signal remains at a high level until capacitor 226 charges to the threshold of NOR gate 224 (approximately 150 microseconds). When the threshold of the NOR gate 224 is reached, the output pulse $t_2$ from the NOR gate 224 returns to a low level. The NOR gate 222 responds to the high level $t_2$ signal as long as it is applied to an input thereof. The output of the NOR gate 222 therefore results in a signal designated as $\bar{t}_1-t_2$, since the NOR gate 222 responds to either the signal $t_2$, when it is at a high level, or the signal $t_1$, when it is at a high level. The signals designated as $t_1$, $t_2$ and $\bar{t}_1-t_2$ control a sampling RC network 240 via analog switches 234, 236, and 230, respectively.

The sampling RC network 240 comprises a resistor 242 and a capacitor 244, and is controlled by switching the charge supply through analog switch 234 to sample the regulated voltage between the time the sampling signal $t_1$ goes to a high level and the reception of the next ignition pulse. When the next ignition pulse is received, the falling edge of the sampling signal $t_1$ cuts off the charging voltage to the capacitor 244 by turning off the analog switch 234. The sampled voltage (charge) is then transferred onto capacitor 254 by closed switch 236 during the application of the high level portion of transfer signal $t_2$. During the high level portion of the signal $\bar{t}_1-t_2$, analog switch 230 is closed and dumps (discharges) any remaining charge on capacitor 244 through resistor 232 to ground. When the sampling signal $t_1$ again goes to a high level, the capacitor 244 is already initialized and begins charging over the new sample period.

Therefore, it can be seen that, as the speed of the engine is increased, the frequency of ignition pulses increases with a corresponding decrease in sample time. Decrease in sample time causes a corresponding decrease in the amount of charge stored during the sample period in the sampling network 240.

Figure 5:
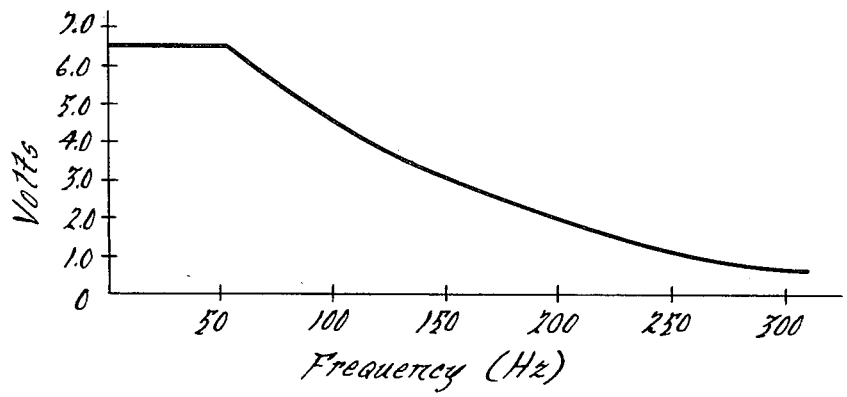

The holding network 250 includes the capacitor 254, a resistor 252, a capacitor 256, and a voltage follower 258. The output of the holding network 250 is the output of the tachometer 200 and is shown in FIG. 5 as a voltage which inversely varies as a function of engine RPM (ignition frequency).

The charge transferred onto capacitor 254 through analog switch 236 during the application of the high level portion of transfer signal $t_2$ is filtered by the low pass network formed by the resistor 252 and capacitor 256 to remove some of the voltage ripple; and impedance matching is achieved by the voltage follower 258.

During the occurrence of the high level portion of transfer signal $t_2$, the charge on the capacitor 244 is balanced with the charge on capacitor 254. Therefore, if the charge on the capacitor 244 is less than the charge on capacitor 254, the closing of the switch 236 will cause the charges to balance and the capacitor 244 will be subsequently discharged prior to the next sampling pulse being applied to switch 234.

The output of the tachometer 200 is fed to the controller section 400 via capacitor 401 and resistors 407 and 408, to a negative input terminal of a comparator 413 where it is constantly compared to a DC reference voltage on the positive input terminal thereof. When the signal on the negative input terminal goes below the reference signal on the positive input terminal of the comparator 413, the controller 400 starts producing an output, via the pulse width modulation circuit 600 that causes the engine to be throttled back by operation of the servo valve 22. This process, ideally, keeps the tachometer output equal to the DC reference voltage at the comparator 413 and thus holds the governing set point speed, as determined by the value of the DC reference voltage.

When the engine speed is below the governing set point speed, the output of the tachometer 200 is at a voltage greater than 2.8 volts and the comparator 413 output voltage is clamped at approximately 1.8 volts by a diode 405. The purpose of the voltage clamp at the output of the comparator 413 is to initialize capacitors 402, and 403. This initialization is held until the output voltage of the tachometer 200 drops below 2.8 volts and reverse biases the diode 405. When the diode 405 is reverse biased, approximately 600 RPM below the desired set point, the controller 400 begins to follow its frequency response characteristics. The controller 400 performs three separate control functions. They are integral, proportional, and derivative. The integral function of the controller 400 is used to cause the output voltage of the controller to move in such a direction so as to cause the static error voltage between the reference voltage and the tachometer output to become zero with time. The proportional function of the controller 400 produces a correction action in response to an error signal independent of time. The proportional function overrides the time constants of the integral function and moves the output of controller 400 by some fractional part of the error signal. The derivative function of the controller 400 is necessary due to the fact that an engine tends to act as a large integrator. The phase lead produced by the controller 400 derivative function helps counteract the inherent lag of the engine and increases the overall response and gain of the system without causing instability.

The secondary derivative circuit 300 receives the output of the tachometer circuit 200 through capacitor 302. The gain of the secondary derivative circuit 300 is determined by the value of the capacitor 302 along with resistor 308, 312, and 314. The gain is determined so that a constant rate of change in tachometer voltage produces a corresponding constant DC voltage at the output of a differentiator 318. In this circuit, a high acceleration rate produces DC output from differentiator 318 that has a large voltage level (+6.5 volts) and for low acceleration rates, the output voltage is below 6.5 volts. The positive input terminal of the differentiator 318 is referenced to 0.5 volts to allow the differentiator 318 to operate in a class AB state. An RC combination of resistor 304 and capacitor 310 gives the circuit some high frequency roll-off so that spurious noise spikes do not effect the derivative operation. The output of the differentiator 318 is fed through diode 316 and the resistor 306 to the controller 400 through resistor 418 which is connected to the positive input of the comparator 413. The connection of the secondary derivative circuit 300 to the controller 400 tends to add voltage to the reference voltage being applied to the positive input terminal of the comparator 413 when a high acceleration rate is detected. Since the secondary derivative circuit 300 is necessary to influence the controller 400 upon the occurrence of fast accelerations, the resistors 306, 556, and 418 determine the level of derivative voltage to be added to the controller 400 so that proper reaction is produced when a high acceleration rate is seen. The derivative voltage level output from the secondary derivative circuit 300 is applied to adjust the controller 400 to respond to fast acceleration conditions. This is accomplished by forcing the reference voltage to move up in value (lowering the RPM set point) causing the controller 400 to respond early to a given acceleration rate, so that there is very little overshoot of the preset speed limit. However, when the engine acceleration is below 100 RPM/SEC the voltage drop across the diode 316 prevents the application of a derivative voltage to the controller 400.

The purpose of the pre-bias circuit 550 is to produce a false set point approximately 250 RPM below the actual set point. This false set point is held until the controller 400 starts to react to the engine reaching that false set point. The feed forward circuit 500 then senses the reaction of the controller 400, when the output voltage of controller 400 exceeds the voltage appearing on the positive terminal of comparator 513. The output of comparator 513 will ramp in a downward direction causing the pre-bias amplifier 563 to reduce the amount of bias that the pre-bias circuit 550 is contributing and thereby allows the false set point to be retarded back to the actual set point. This changing set point causes the system to respond to a slow acceleration rate so that when the actual set point is reached, the engine will experience very little overshoot of that limit.

A non-inverting amplifier 563 of the pre-bias circuit 550 has a negative input terminal connected to resistor 562 which is in turn connected to a reference voltage through resistor 551. The positive input terminal of the amplifier 563 is connected to the output of a comparator 513 in the feed forward circuit 550. The amplifier 563 has a gain factor of 2 and acts similar to a switch. In this configuration, the output of the switch 563 is saturated at 6.5 volts when the output of the comparator 513 is at any point above 3.25 volts. The output voltage of the switch 563 is fed through a diode 560 which is used as a current block to the divider formed by resistors 554 and 556. The divider network adds approximately 250 millivolts to the 2.2 volts reference voltage when the output of the switch 563 is at 6.5 volts. This voltage corresponds to a false set point of approximately 250 RPM below the preset speed limit.

The feed forward circuit 500 utilizes a comparator 513 having a negative input terminal connected to a resistor 502 which is in turn connected to the output of the controller 400. A positive input terminal of the comparator 513 is connected to the pre-bias switch 563 through resistor 555 and diode 560. When the feed forward circuit output is at a low level, the switch 563 outputs a pre-bias voltage through diode 560 to the reference input of the controller 400.

The pre-bias voltage output therefore shifts the entire reference by 250 millivolts. The feed forward circuit 500 is energized when the controller 400 output voltage exceeds the voltage on the positive terminal of comparator 513. This voltage is produced by a resistor network consisting of resistors 555 and 557. Because of this pre-bias, the positive input terminal on comparator 513 is approximately 3.2 volts. Diode 405, in the controller 400, clamps the controller output to initialize capacitors 402, 403, and 404 and causes the output of the comparator 513 to be at 1.8 volts. This makes the negative input terminal of comparator 513 also 1.8 volts. With these conditions, the comparator 513 output is in a saturated high condition of 6.5 volts. Therefore, as the engine starts accelerating at a slow rate and the false (pre-bias) set point is surpassed, the controller 400 output voltage starts rising in reaction thereto. When the controller output from comparator 413 goes above approximately 3.2 volts, the negative input terminal of the comparator 513 becomes dominant and the output of the comparator 513 starts ramping down at a rate determined by resistor 502 and capacitor 504.

As the output of the comparator 513 goes below 3.25 volts, the false (pre-bias) set point is removed and the output of the switch 563 is at approximately 2.6 volts. The diode 560 becomes reverse biased and leaves the output of the comparator 513 at 1.3 volts. The actual set point is now present at the reference input of the controller 400. Therefore, since the system has been responding to engine acceleration approximately 250 RPM below the actual set point, and had a governing effect, no overshoot occurs by the time the actual set point is reached. The relationship between the feed forward circuit 500 and pre-bias circuit 500 compensates for overshoot in the slow to medium entry modes, where the secondary derivative circuit 300 has very little effect.

The pulse width modulator circuit 600 includes an oscillator circuit 610. Resistors 602 and 604 along with a diode 606 are used for hysteresis control around an operational amplifier 613. The diode 606 is used to change the amount of hysteresis, when it is forward biased, by switching resistor 602 in parallel with resistor 604. The hysteresis results in a square wave appearing at the output of operational amplifier 613, which in turn produces an RC charging wave, such as that shown in FIG. 6, at its negative input terminal through the RC network of resistor 608 and capacitor 609. The amount of hysteresis determines the amplitude of the wave shown in FIG. 6.

Figure 6:
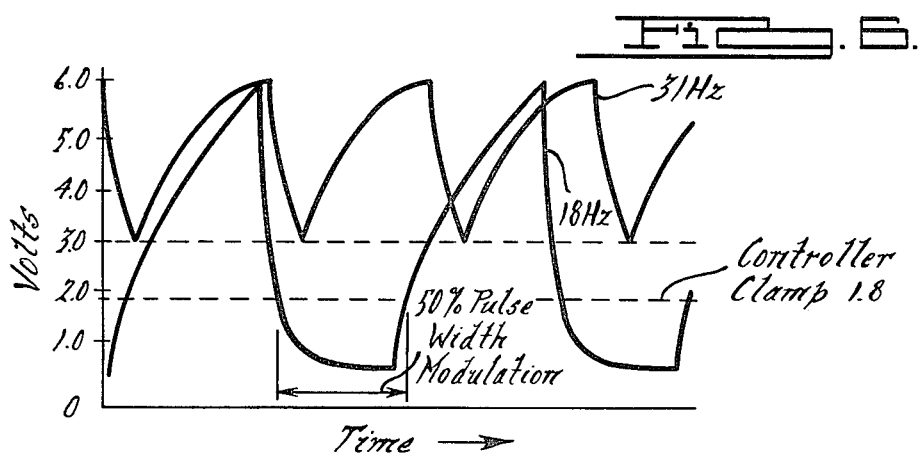

When the governor unit is in control with 50% modulation applied to the servo valve 22, the output of operational amplifier 513 of the feed forward circuit 500 is approximately 0.5 volts. This places 0.3 volts on the positive input terminal of operational amplifier 613. When the negative input terminal of operational amplifier 613 goes below 0.3 volts, the output of 613 switches to a high level of approximately 6.5 volts. When this occurs, the parallel combination of resistors 602 and 604 biases the positive input terminal of operational amplifier 613 to approximately 6 volts. This also causes capacitor 609 to charge to the output voltage level through resistor 608. Charging continues until the voltage across capacitor 609 excees 6.0 volts. At this point, the negative input terminal of operational amplifier 613 becomes dominant and the output of amplifier 613 switches back to 0.6 volts. The 0.6 volts output of 613 returns the voltage on the positive input terminal to 0.3 volts. The capacitor 609 then discharges through resistor 608 until it reaches the 0.3 level, where the operational amplifier 613 output returns to a high level. Hence, the 18 Hz nonsymmetrical oscillator waveform shown in FIG. 6 is formed at the junction between the capacitor 609 and resistor 608, when the governor is in full control.

From the above discussion, it can be seen that the main frequency determining elements of the oscillator are resistor 608 and capacitor 609. However, the frequency and voltage swing of the oscillations can also be changed by the feed forward circuit 500 and the hysteresis resistors 602, 604, and 616. The feed forward circuit 500 provides that change in hysteresis by changing its output voltage from a maximum of 6.5 volts, when the controller 400 is pre-biased, to 0.5 volts when the feed forward circuit removes the pre-bias. Throughout this range of change in the output of the feed forward circuit, the hysteresis characteristic is changed and thus, the frequency and voltage swing of the oscillator output changes.

When comparator 513 ramps down below 2.8 volts, the voltage appearing at the junction of resistors 506, 510 and 616 decreases. This reduction in voltage causes the lower switch point of the oscillator to decrease below the 3 volt level and thereby increases the hysteresis. The larger value of hysteresis forces the waveshape, at the junction of resistor 608 and capacitor 609, to be expanded (decreased in frequency). This expansion causes the oscillator waveshape at the junction of resistor 608 and capacitor 609 to interact with the output of controller 400 at the comparator 623 and increase the modulation of the servo valve 22.

Assuming for a moment that controller 400 is in a clamped state, which is a zero pulse width reference for the modulator circuit; when the lower switch point of the oscillator is brought down to 0.3 volts by comparator 513, the difference in voltage between the clamp state of the controller 400 and the lower switch point of the oscillator causes the modulator circuit to produce a 30% modulation at its output. In effect, by moving the lower switch point of the oscillator below the clamp voltage of the controller 400, the feed forward function is produced at the modulator. Since the carburetor servo mechanism is adjusted so that 50% modulation is required for steady state governor control, the controller output voltage is only required to produce 20% pulse width when the feed forward function is used. Therefore, there is a time savings by not requiring the controller 400 to produce the total 50% pulse width of modulation and this results in an increase in response of the governor system. The feed forward circuit is also used to force the lower switch point of the oscillator to a three volt level when the engine is not near the set point to thereby prevent any pulse from being produced from the modulator, until the controller 400 output voltage exceeds 3 volts.

The output of the oscillator 610 is compared with the output of the controller 400 at the comparator 623 in the pulse width modulator 600. Therefore, any change in the oscillator wave shape will actually change the gain of the system. In order to produce the pulse width modulated output signal to driver transistor 630, the oscillator output is compared to the controller output at respective negative and positive input terminals of comparator 623. Whenever the voltage level of the controller output is greater than that of the oscillator, the output of comparator 623 goes to a high level and turns on transistor 630. Transistor 630 then energizes the servo valve 22 that is attached to the split throttle shaft 24. Likewise, when the controller's output voltage is less than that of the oscillator's output voltage, transistor 630 is turned off. This releases control of the servo valve 22 and the throttle is free to be opened by the accelerator pedal 26 and associated linkage. The modulation of the servo valve 22 occurs at approximately an 18 Hz rate, while the governor is in control of the servo valve, and the amount of "on time" is determined by the controller output voltage. Therefore, the percent of modulation is continually adjusted to hold the desired set point.

A divider network, consisting of resistors 411 and 412, is used to prevent the modulator pulse width from exceeding 90% modulation. The purpose of this is to prevent the throttle plate from sticking in cold weather conditions. With 90% modulation applied to the servo, the mechanical linkage will rattle at the modulator frequency to thereby reduce the possibility of the servo sticking.

In some circumstances, such as when the vehicle is cruising at the governed RPM and the engine begins to see an increase load from a curve, wind gusts, uphill grade, etc., the engine speed will begin to drop. However, if the governor system were to return the engine back to accelerator control, with the throttle plates completely open, engine surging would result in governor control back to the predetermined speed limit.

Without use of a reload circuit, as the engine speed drops below the governing RPM, a negative error voltage would be created at the input to the controller 400. The controller 400 would then integrate this error and the output voltage would be decreased by causing a reduction in the pulse width duty cycle, and thereby allow the throttle plate to fully open.

However, with reload, a non-symmetrical oscillating voltage is connected to the controller amplifier 400 input to cause a gain reduction. Therefore, with a reduced gain, the amount of error signal needed to lower the control circuit output is increased. The controller gain is determined by the ratio of "on" resistance of diode 405 and the value of resistor 407. When the engine RPM approaches the governor set point, the diode 405 "on" resistance increases to the point where the voltage difference across diode 405 reverses in polarity and the diode switches "off". The controller gain diode 405 in the "off" state is determined by capacitors 401, 402, 403, 405, and resistors 407, 408, and 411.

The programmable reload is accomplished by use of the clamp circuit in the controller 400 and the property of the feed forward circuit. The sequence is as follows: The non-symmetrical AC signal is capacitively coupled by capacitor 712, from the junction of capacitor 609 and resistor 608, through resistor 714 to the positive terminal of comparator 413. This coupling adds no DC offset to the preset reference voltage. The non-symmetrical AC signal amplitude modulates the reference. The resistor network of resistors 418 and 714 determine the amplitude of the applied modulation; and the output signal of the controller 400 consists of a non-symmetrical AC wave impressed on a DC voltage.

The AC signal on the output of controller 400 will be ±0.5 volts. This signal will not effect the amount of modulation produced by the modulator since there is no change to the modulator transfer function. However, since the AC signal is a non-symmetrical wave, the signal will have a DC term which is added to the output of the controller and will only be seen by the integration portion of the comparator 513. The integration circuit is made up of capacitor 504 and resistor 502 on comparator 513. This integrator in the feed forward circuit sees the additional DC voltage term on the output of the controller 400. This DC voltage term only has an effect when the controller 400 starts to respond to the engine speed decreasing below the set point since the feed forward circuit is held in until the engine decreases sufficiently below the set point. Specifically, as the controller output decreases in voltage, the controller 400 must move further into the clamp region to overcome the DC voltage term seen by the comparator 513. This must occur before the feed forward circuit will release and the modulator is allowed to return to zero pulse width.

The amount of RPM reload may be adjusted by controlling the amplitude of the AC signal inserted into the controller amplifier. The presence of the AC signal forces the output of the controller into the clamp region, causing a gain reduction to occur within the amplifier. This gain reduction requires the engine RPM to move farther from the governing set point to produce an amount of error signal sufficient to overcome the effects of the feed forward circuit 500.

In summary, the governor control system described above, has no means by which it may accelerate or decelerate the engine; and it should be understood that the governor system has the capability of adjusting the throttle plate 24 only when the driver accelerates the engine to a value which approaches the predetermined speed limit (RPM set point). Furthermore, when the driver releases the accelerator pedal, the governor system relinquishes the control of the throttle back to the driver when the engine speed drops below the reload setting.

It will be apparent that many modifications and variations may be effected without departing from the scope of the novel concept of this invention. Therefore, it is intended by the appended claims to cover all such modifications and variations which fall within the true spirit and scope of the invention.

I claim:

1. An electronic engine governor control being responsive to the speed parameter of an associated engine for limiting said speed to a predetermined maximum amount, by regulating the throttle opening, comprising:
   means connecting said control to the ignition system of said associated engine and producing a voltage having a value which varies with respect to the speed of said engine;
   means for supplying a reference voltage corresponding to said predetermined maximum speed limit;
   means for comparing said reference voltage with said variable voltage and producing an output signal when said voltages are approximately equal;
   means responsive to said output signal for correspondingly regulating said throttle opening; and
   means responsive to said output signal for supplying said reference voltage to said comparing means adjusted by an amount related to said output signal to prevent engine speed limit overshoot at low to medium acceleration rates;
   wherein said low to medium acceleration rate overshoot prevention means includes a pre-bias means, which normally outputs a DC voltage superimposed on said reference voltage at said comparing means for offsetting said predetermined maximum speed limit to a lower speed, and a feed forward means, connected to said comparing means and said pre-bias means, which responds to the comparing means output signal exceeding a predetermined level and lowers the pre-bias means DC output voltage.

2. An electronic engine control as in claim 1, further including:
   means responsive to said output signal for supplying said reference voltage to said comparing means with a non-symmetrical AC modulation signal superimposed thereon to create a reload control when said output signal is generated and until said variable voltage changes by a predetermined amount corresponding to a predetermined engine speed below said predetermined engine speed limit.

3. An electronic engine control as in claim 1, wherein said regulating means includes an oscillator for generating a non-symmetrical AC waveform and said feed forward means is also connected to said oscillator to effect the amplitude and frequency of said AC waveform in response to said comparing means DC output voltage.

4. An electronic engine control as in claim 3, further including means for capacitively coupling said non-symmetrical AC waveform to said comparing means superimposed on said reference voltage to create a reload control until said variable voltage changes by a predetermined amount corresponding to a predetermined engine speed below said predetermined engine speed limit.

5. An electronic engine control as in claim 1, wherein said connecting means is a tachometer circuit which produces a DC voltage level which is inversely related to the speed of the engine.

6. An electronic engine control as in claim 1, further including:
   means responsive to said variable voltage for detecting rapid acceleration rates and supplying said reference voltage to said comparing means adjusted by an amount proportional to the rate of acceleration.

* * * * *